US008312743B2

(12) United States Patent
Pun et al.

(10) Patent No.: US 8,312,743 B2
(45) Date of Patent: Nov. 20, 2012

(54) METHOD FOR FABRICATING BURIED ION-EXCHANGED WAVEGUIDES USING FIELD-ASSISTED ANNEALING

(75) Inventors: Edwin Yue Bun Pun, Hong Kong (CN); Ke Liu, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 487 days.

(21) Appl. No.: 11/132,359

(22) Filed: May 18, 2005

(65) Prior Publication Data
US 2006/0260364 A1 Nov. 23, 2006

(51) Int. Cl.
*C03B 32/00* (2006.01)
(52) U.S. Cl. .......... 65/386; 65/394; 65/400; 65/425
(58) Field of Classification Search ........ 65/386, 65/390, 400
See application file for complete search history.

(56) References Cited

U.S. PATENT DOCUMENTS

| 3,880,630 A * | 4/1975 | Izawa ................ 65/30.14 |
|---|---|---|
| 4,842,629 A | 6/1989 | Clemens et al. ........ 65/30.13 |
| 4,913,717 A * | 4/1990 | Cooper ............... 65/30.13 |
| 4,993,034 A * | 2/1991 | Aoki et al. ............ 372/40 |
| 5,160,360 A * | 11/1992 | Seki et al. ........... 65/30.13 |
| 5,160,523 A | 11/1992 | Honkanen et al. ...... 65/30.13 |
| 5,269,888 A | 12/1993 | Morasca .............. 204/130 |
| 5,318,614 A | 6/1994 | Beguin .............. 65/30.13 |
| 5,491,708 A | 2/1996 | Malone et al. .......... 372/41 |
| 2005/0176573 A1 * | 8/2005 | Thoma et al. ............ 501/69 |

FOREIGN PATENT DOCUMENTS
EP 0269996 6/1988

OTHER PUBLICATIONS
Ramaswamy et al, Process optimizatoin of buried Ag+-Na+ ion-exchanged waveguides: theory and experiment. Applied Optics. vol. 27, No. 9, May 1, 1988, pp. 1814-1819.*

* cited by examiner

*Primary Examiner* — John Hoffmann
(74) *Attorney, Agent, or Firm* — Heslin Rothenberg Farley & Mesiti P.C.

(57) ABSTRACT

A method for forming buried ion-exchanged waveguides involves a two-step process. In a first step a waveguide is formed at the surface of a substrate using an ion-exchange technique. After formation of the waveguide, a field-assisted annealing is carried out to move the waveguide away from the surface of the substrate so that it is buried in the substrate. Exemplary field-assisted annealing is carried out at a temperature close to the ion-exchange temperature ±10° C. to optimize results.

8 Claims, 6 Drawing Sheets

Step 1 Ion-exchange          Step 2 Field-assisted annealing

METHOD FOR FABRICATING BURIED ION-EXCHANGED WAVEGUIDES USING FIELD-ASSISTED ANNEALING

FIELD OF THE INVENTION

This invention relates to a method of forming waveguides buried in a substrate such as glass by a two-step process including an ion-exchange step to create the surface waveguide, followed by field-assisted annealing to bury the waveguide in the substrate.

BACKGROUND OF THE INVENTION

Erbium-doped waveguide amplifiers (EDWAs) have many advantages over erbium-doped fiber amplifiers (EDFAs) due to their potential for reducing the costs and sizes, and integration with other waveguide devices. Different fabrication techniques have been used to make these Er-doped planar waveguide devices, such as ion-exchange, radio-frequency sputtering, sol-gel, plasma-enhanced chemical vapor deposition, and others. As expected, different techniques lead to different formations and qualities of the waveguides. The ion-exchange technique is attractive for making graded-index surface and buried waveguide devices because of its simplicity and low cost. Currently, the main difficulty in EDWAs, as compared to EDFAs, is that a sufficiently high gain must be obtained in a much shorter device length. This implies using about two orders of magnitude higher $Er^{3+}$ ions concentration, with correspondingly higher risk of cluster formation and stronger ion-ion interactions. Important issues are to optimize the glass material composition (which often implies co-doping with $Yb^{3+}$ ions) and the waveguide fabrication process. Many studies have been carried out on optical glasses activated by rare-earth ions. Phosphate glasses are known to be suitable rare-earth host materials because of their spectroscopic characteristics, including a large emission cross section and a weak interaction among rare-earth ions. It is possible to achieve a high gain within a short waveguide length. These glasses have been used to produce ion-exchanged waveguide amplifiers with more than 3 dB/cm gain coefficients.

Optical waveguides have been fabricated in $Na^+$-based glasses using either a $K^+$—$Na^+$ or an $Ag^+$—$Na^+$ ion-exchange method. The $K^+$—$Na^+$ ion-exchange process has several advantages compared to the $Ag^+$—$Na^+$ ion-exchange process: lower losses, increased stability, and less expensive. Buried waveguides have attracted much attention because of their low surface scattering losses and symmetric refractive index profiles, and the mode profiles match well with those of optical fibers. Various experimental approaches have been used to achieve this goal. In general, field-assisted ion-exchange (FAIE) is often used to fabricate buried waveguides including one-step electromigration technique and two-step ion-exchange. Examples of such prior art can be found in U.S. Pat. No. 5,318,614, U.S. Pat. No. 5,269,888, U.S. Pat. No. 4,842,629 and EP0269996A.

Field-assisted ion exchange is based on the accelerated migration of incoming ions by applying an electric field across a glass substrate between its plane surfaces. However, such methods involve using molten salt as the electrode, are complicated and require an expensive special sample holder and sealed materials. One known dry-technique that does not use a molten salt is a silver film ion-exchange process (U.S. Pat. No. 5,491,708, U.S. Pat. No. 5,160,523).

SUMMARY OF THE INVENTION

According to the present invention there is provided a method of forming an optical waveguide in a substrate, comprising the steps of:
(a) forming a waveguide in a surface of said substrate by an ion-exchange process, and
(b) carrying out a field-assisted annealing on said substrate to move said waveguide away from said surface.

In embodiments of the invention the substrate is a phosphate glass doped with $Er^{3+}$ and $Yb^{3+}$ ions, though the invention could also be performed using a silicate glass as the substrate. The ion-exchange process may be a $K^+$—$Na^+$ process or a $Ag^+$—$Na^+$.

In preferred embodiments of the invention after the formation of the surface waveguide by the ion-exchange process, conductive materials are deposited on both sides of the substrate to serve as electrodes in the field-assisted annealing step.

In an exemplary embodiment, field-assisted annealing is carried out at a temperature of between 220° C. and 420° C., but preferably at or close to an optimum temperature of the ion-exchange temperature, e.g., ±10° C. The field-assisted annealing may be carried out for between 15 minutes and 1 hour, and an electric field of between 60V/mm and 180V/mm may be applied across the substrate during the field-assisted annealing.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

In preferred embodiments of the present invention a dry process using field-assisted annealing (FAA) is used to form buried waveguides. This dry process is simple, inexpensive, and easy to control. Furthermore, the deterioration of the glass surface is avoided compared to the prior art FAIE method. The method of embodiments of the present invention is particularly suitable for fabricating $K^+$—$Na^+$ ion-exchanged buried waveguides in $Er^{3+}$—$Yb^{3+}$ co-doped phosphate glasses, but in principle could be used with other ion-exchange methods and other glasses.

Figure 1:
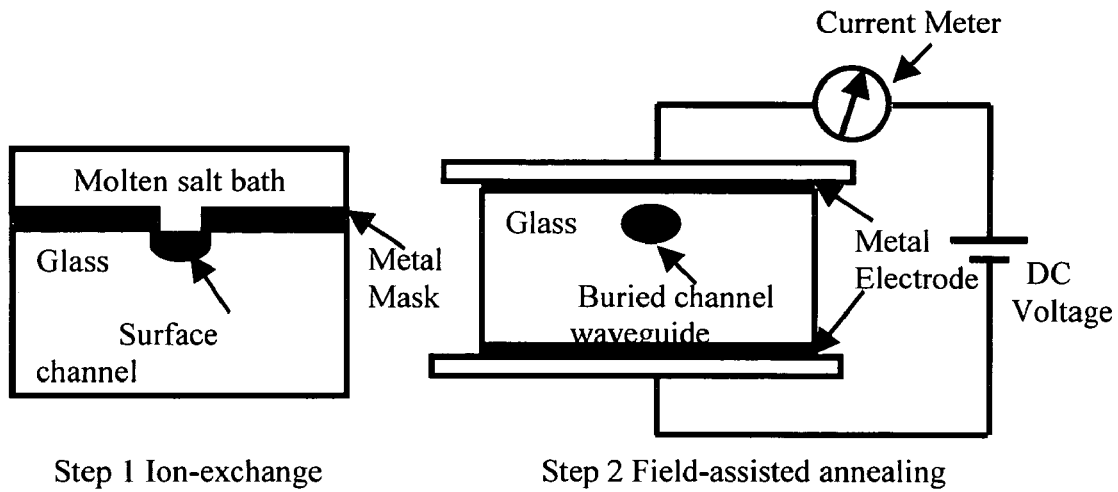
FIG. 1 is a schematic diagram of the buried channel waveguide fabrication process according to an embodiment of the present invention.

FIG. 1 shows schematically the buried channel waveguide fabrication process. The substrates used were phosphate glasses co-doped with ~2 wt % $Er_2O_3$ and ~5 wt % $Yb_2O_3$. The first step is an ion-exchange process in which $K^+$—$Na^+$ ion-exchanged channel waveguides were fabricated first in pure $KNO_3$ molten bath, with an exchange temperature T=385° C. and a time t=1 h. Groups of 6 µm and 8 µm wide channel openings were fabricated in Al film deposited on the glass surfaces using a standard micro-fabrication process and wet chemical etching method. After cooling down in air to room temperature, the Al film mask was removed and the two end faces of the waveguides were polished, and the first fabrication step was completed.

The second step is a field-assisted annealing (FAA) process which serves to bury deeper into the substrate the waveguides formed by the first step. A 200 nm thick Al film and a 150 nm thick Au film were deposited by thermal evaporation onto the top and bottom of the glass substrates, respectively. They were then used as the positive and negative electrodes in the FAA process, but before applying a voltage the sample edges were checked carefully in order to prevent short-circuiting, and the samples were then placed in a furnace with the FAA temperature $T_A$ controlled to ±2° C. The $T_A$ ranged from 220° C. to 420° C. and the FAA time $t_A$ from 15 min to 1 h. Again, the samples were allowed to cool slowly to room temperature, and buried channel waveguides were formed.

Figure 2:
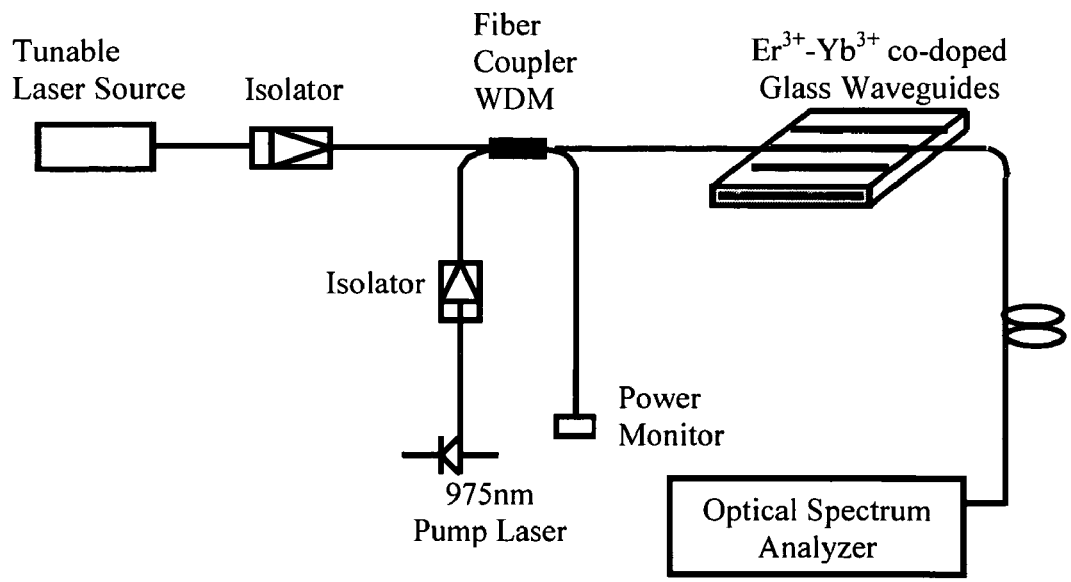
FIG. 2 shows an experimental setup for measuring the optical gain of the waveguide amplifiers formed in accordance with embodiments of the invention.

Propagation losses of the buried channel waveguides were measured using cut-back method at 1.3 µm wavelength. The experiment was carried out at 1.3 µm wavelength in order to avoid the strong $Er^{3+}$ absorption at 1.5 µm. To increase the accuracy it is important to maintain the same input coupling efficiencies. The absorption spectrum was measured on a 1.6 mm thick bulk glass sample using a PerkinElmer UV-VIS-NIR Lambda 19 double beam spectrophotometer. The fluorescence spectrum around 1.5 µm wavelength was recorded by a SPEX 500M monochromator, and the sample was pumped by the 514 nm wavelength light from an Ar laser and detected by a nitrogen-cooled Ge-detector. The small signal gain at 1.534 µm was measured by pumping the waveguide with a 975 nm laser diode, and FIG. 2 shows the corresponding experimental setup. The input signal source was a HP8161A tunable laser, and a 980 nm/1550 nm wavelength division multiplexing (WDM) fiber coupler was used to combine both the signal and pump lights. The output light was coupled into the optical spectrum analyzer via a multimode fiber, and the optical gain and the amplified spontaneous emission (ASE) spectra were measured.

A. Mechanism of Buried Waveguide Formation

Monovalent cations are the most mobile ions in phosphate glasses because the cations are bound weakly in the $PO_4$ tetrahedron network. After ion-exchange, the conducting ions in the glasses are alkali ions such as $Na^+$ and $K^+$. At high $T_A$ the electrical conductivity σ of glasses usually fits an Arrhenius relation, $$\sigma = z^2 e N \mu_0 \exp(-Q/RT_A) = \sigma_0 \exp(-Q/RT_A) \quad (1)$$

where z is the charge of the ion, e is the elementary charge, N is the quantity of ions capable of migrating per $cm^3$, $\mu_0$ is the mobility of the ion, Q is the activation energy, and R is the universal gas constant. Because σ depends on the ionic motion it is accepted universally that the electric current is due to the alkali ions, and from Eq.(1) σ increases as $T_A$ increases. When $T_A$ is low (<200° C.) the value of σ is also low. The ions present in the glasses do not contribute to σ significantly because of their low mobilities. When $T_A$ is high (>300° C.), the value of σ is also high. This corresponds to a low resistance or a high current in the glass substrate. Many ions take part in the conduction process when an assisted electric field E is applied.

In the FAA case two basic mechanisms exist that drive the exchanged ions deeper into the substrate: the thermal mobility of ions ($K^+$) in the waveguide region at sufficiently high $T_A$, and the applied field E across the glass causing a current to flow. At high $T_A$ both $Na^+$ and $K^+$ ions move in the same direction in the glasses driven by E. In the pure annealing case, because the ions inside the waveguides diffuse and move randomly according to a Gaussian law, it is difficult to form buried waveguides. In the case of FAA, however, in addition to this random diffusion motion the applied field E imparts a drift velocity to the ions. When the concentration of $K^+$ ions in the channel waveguides near the top surface of the glasses is reduced due to the migration process, buried channel waveguides were formed accordingly.

Figure 3:
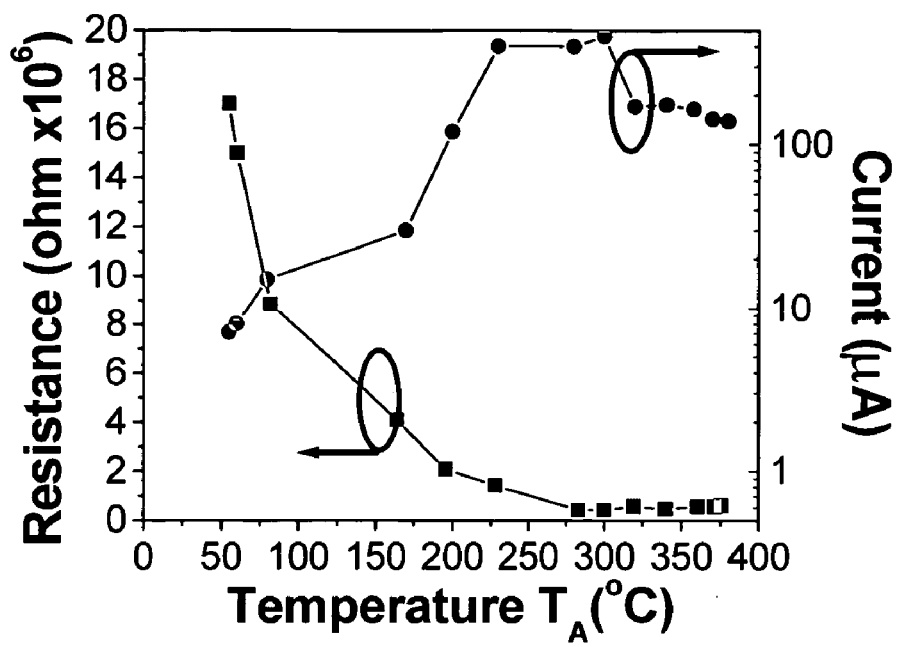
FIG. 3 shows measured resistance and current in embodiments of the invention.

The $Na^+$ ions, however, are blocked at the bottom surface of the cathode and do not flow out to the metal electrode. They pile up beneath the surface and occupy vacancies in the glass matrix. The anode repels the alkali ions moving towards the cathodes, leaving a layer of nonbridging oxygen ions near the top surface. Hence, direct current method can be used to measure σ at different $T_A$. The current in the sample was measured using a current meter, and it decreases with increasing $t_A$ at high $T_A$. FIG. 3 shows the measured glass resistance and current as a function of $T_A$, and E=100V/mm was used. As $T_A$ increases, the resistance of glass decreases and the current increases. When $T_A$ is increased to ~400° C., the resistance and current reach a stable value. This ionic conductivity property is used to fabricate the buried waveguides.

B. Spectroscopic Properties

Figure 4:
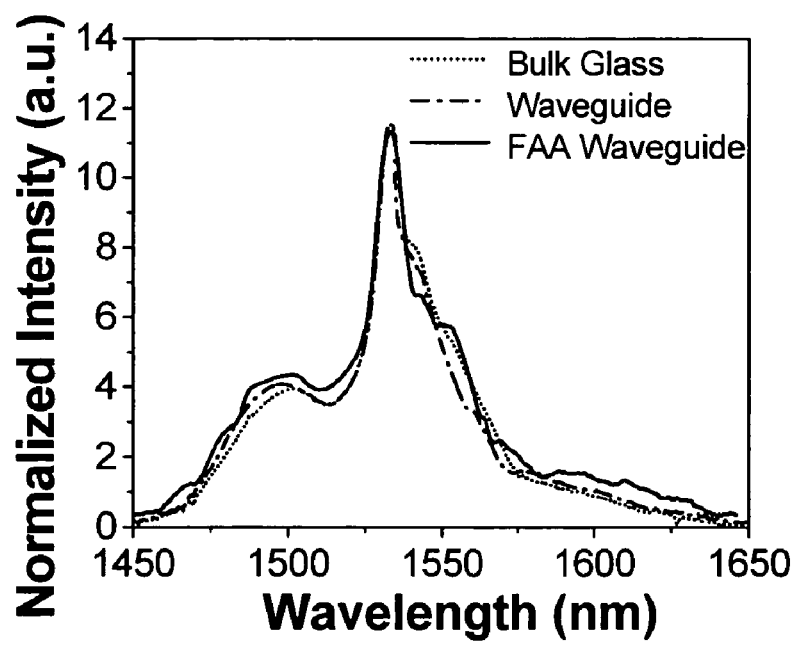
FIG. 4 shows the fluorescence spectrum measured in bulk glasses and ASE spectra recorded in ion-exchanged waveguides and waveguides formed in accordance with embodiments of the invention.

FIG. 4 compares the ASE spectra of ion-exchanged waveguides and FAA waveguides, and the fluorescence spectrum of bulk glasses. The spectra are similar to each other, indicating that the spectroscopic property of the bulk glasses is unaffected by the waveguide fabrication process. The peak wavelength is around 1.534 µm, and is due to the transition of $^4I_{13/2}$ to $^4I_{15/2}$ level in $Er^{3+}$. The full-width at half-maximum (FWHM) is ~40 nm. The measured FWHM does not depend on the pump wavelength and is consistent with the value of fluoro-phosphate glasses, but larger than those measured in silicate glasses. In addition, the optical absorption spectrum were measured at room temperature using a double spectrometer with a spectral bandwidth of 1 nm. The measured single pass peak absorption was ~4.5 dB/cm at 1.534 µm.

C. Waveguide Characteristics

The buried channel waveguides support a single transverse mode at 1.55 µm wavelength. $T_A$=380° C. and $t_A$=45 min were used. Single mode buried waveguides exhibit a lower propagation loss of ~0.3 dB/cm at 1.3 µm wavelength.

Other than scattering and absorption losses in the waveguide amplifiers, coupling losses between the devices and the input and output fibers can reduce significantly the signal intensity propagating in the active region. Thus, optimizing the matching between the mode field guided in the amplifier structure and the mode field propagating in the fibers can considerably improve the overall performances. Thermal FAA was carried out in order to obtain a better geometric and index matching. The $K^+$ ions are allowed to diffuse deeper inside the glass by the constant E during the FAA process. Although no other ions are introduced from outside, this process still leads to a slight broadening of the refractive index profile, resulting in a slight decrease in the maximum index change with respect to the as-exchanged samples.

Different $T_A$ at 220° C., 320° C., 380° C. and 420° C. were used for the same $t_A$. The coupling losses (or mode mismatch losses) were evaluated using the following overlap integral $$I = \frac{\left(\int_{-\infty}^{\infty}\int dx\,dy E_w E_f\right)^2}{\left(\int_{-\infty}^{\infty}\int dx\,dy E_f^2\right)\left(\int_{-\infty}^{\infty}\int dx\,dy E_w^2\right)} \quad (2)$$

where $E_w$ and $E_f$ are the near-field distributions of waveguide and fiber, respectively. Eq.(2) implies a time-consuming calculation, and a simplified expression was used based on a Gaussian field approximation $$I \approx \frac{4a^2 xy}{(a^2+x^2)(a^2+y^2)} \quad (3)$$

where σ is the fiber mode diameter, and x and y are the horizontal and vertical dimensions of the waveguide mode, respectively. Table 1 gives the 1/e intensity horizontal and vertical mode sizes as well as the calculated coupling losses. A minimum mode mismatch loss of ~0.32 dB is obtained when the FAA experiment was carried out at $T_A \approx T$. As $T_A$ increases the horizontal and vertical mode sizes expand, and there is an optimum value of $T_A$ to obtain minimum coupling losses.

TABLE 1

Calculated coupling losses at different $T_A$, $t_A$ = 45 min.
The mode size is defined as the 1/e intensity value.

| FAA $T_A$ | Mode Horizontal Size (μm) | Mode Vertical Size (μm) | Coupling Losses (dB) |
|---|---|---|---|
| 220° C. | 8.7 | 6.2 | 0.64 |
| 320° C. | 9.2 | 7.0 | 0.39 |
| 380° C. | 14.8 | 12.5 | 0.32 |
| 420° C. | 17.4 | 14.8 | 0.78 |

Figure 5A:
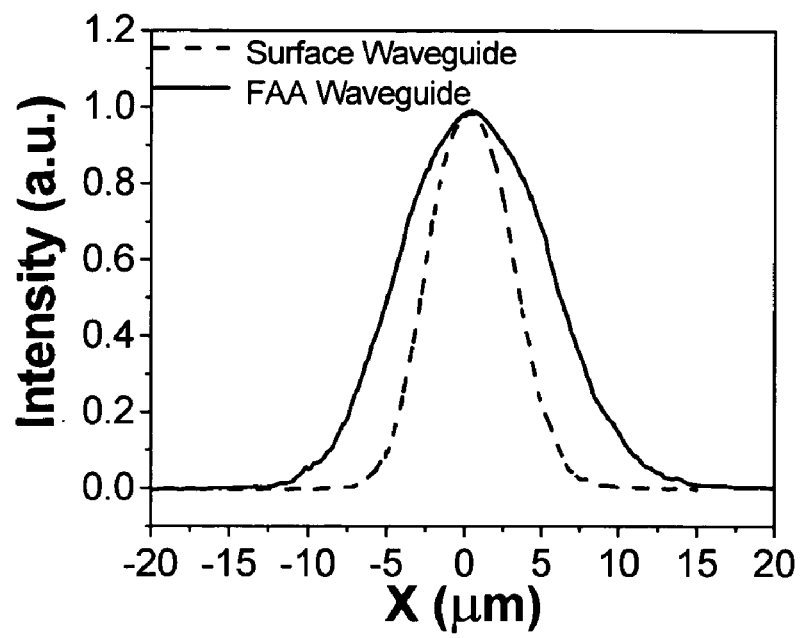
FIG. 5 shows a comparison of (a) the horizontal width, and (b) the vertical depth near-field mode profiles of an ion-exchanged surface waveguide and a buried waveguide formed according to an embodiment of the invention.
Figure 5B:
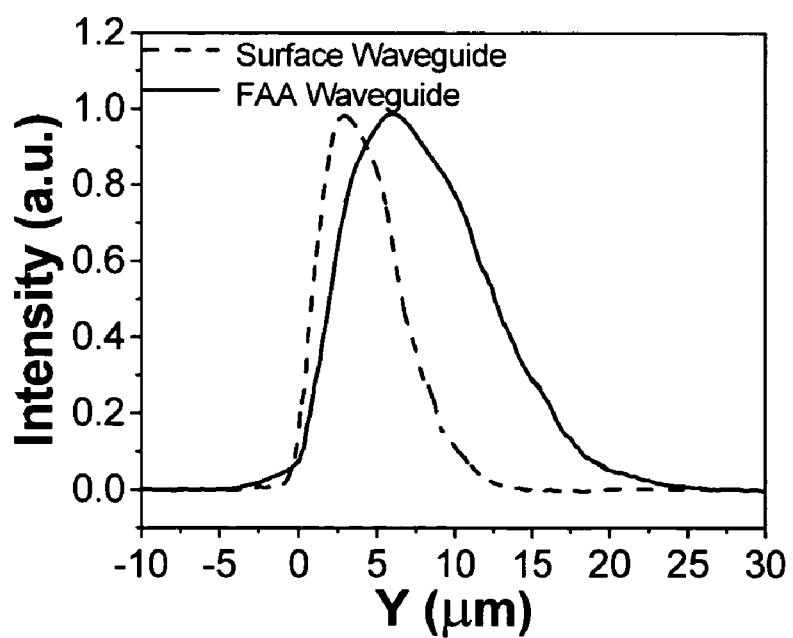

FIG. 5 shows the near-field mode intensity profiles of as-exchanged surface waveguide and buried waveguide. $T_A$=380° C., E=100V/mm and $t_A$=45 min were used. A more symmetrical intensity profile is obtained for the FAA waveguides. After the FAA process, both the horizontal and vertical mode profiles are larger than those of as-exchanged waveguides because of the thermal annealed diffusion, and the profile enables efficient coupling to optical fiber. From FIG. 5(b), the buried depth is estimated to be ~2.81 μm below the glass surface.

D. Gain Characteristics

Figure 6:
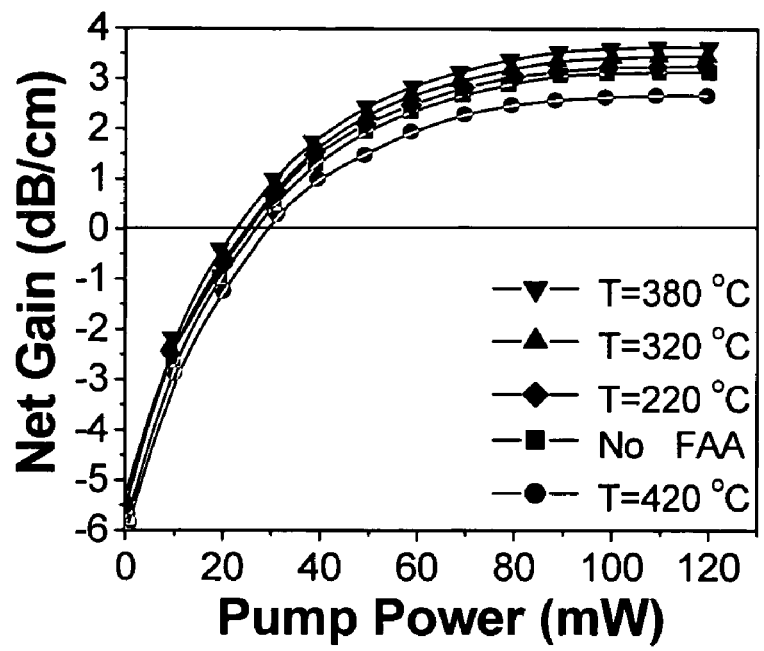
FIG. 6 shows net gain versus pump power for waveguide amplifiers formed according to embodiments of the invention, FIG. 7 plots refractive index against diffusion depth for buried waveguides obtained with varying electric field, FIG. 8 plots refractive index against diffusion depth for buried waveguides obtained with varying annealing time, FIGS. 9(a) and (b) show mode intensity profiles of (a) a surface ion-exchanged waveguide, and (b) a buried waveguide formed in accordance with an embodiment of the invention, and FIG. 10 plots the effective depth of the buried waveguide as a function of applied electric field during an exemplary annealing process.

The net gain $G_{net}$ of a waveguide amplifier is defined as follows:

$$G_{net}=10\log_{10}[(P_{Sig(Amplified)}-P_{ASE})/P_{Sig(Input)}] \quad (4)$$

where $P_{Sig(Amplified)}$ is the amplified signal power, $P_{ASE}$ is the ASE power, and $P_{Sig(Input)}$ is the signal power at the input of the channel waveguide. To measure the gain coefficient, the following equation can be used:

$$G_{net}=(G_{int}-\alpha_p-\alpha_a)/L \quad (5)$$

where $\alpha_p$ is the propagation loss, $\alpha_a$ is the absorption loss at signal wavelength caused by the $Er^{3+}$ ions, and L is the sample length. $G_{int}$ is defined as $$G_{int}=10\log_{10}[(P_{Sig(PumpOn)}-P_{ASE})/P_{Sig(PumpOff)}] \quad (6)$$

where $P_{Sig(PumpOn)}$ and $P_{Sig(PumpOff)}$ are the signal power from the output of the channel waveguide with and without pump power, respectively. FIG. 6 shows the measured results of the net gain. E=100V/mm and $t_A$=45 min for different $T_A$ were used. The signal wavelength was set at 1.534 μm corresponding to the peak wavelength of the fluorescence spectrum. The input small signal power was <−30 dBm and the maximum pump power was 120 mW. As the pump power increases, there is sufficient amplification to compensate the losses, and optical net gain are obtained for all the samples. When $T_A$ is too low (diamond), the net gain is not improved compared to the as-exchanged samples (square). This is because buried waveguides have not been formed effectively at low $T_A$ (<200°) due to the low σ. When $T_A$ is increased the net gain is improved. At $T_A \approx T$, buried channel waveguides are formed, the scattering losses are reduced and the coupling efficiency is increased. When $T_A$>T the gain is reduced, as seen in the FIG. 6 (circle). In theory, higher $T_A$ below the transition temperature of glasses leads to higher σ and stronger ionic conduction. However, the samples were preheated slowly to high $T_A$ (420° C.) before E was applied, and during the process (tens of minutes exceeding T=385° C.) pure annealing effect can take place which modifies the original refractive index profile and affects the confinement of the optical waveguide, and the overall waveguide performance deteriorates. The result indicates that T limits $T_A$. An improved net gain of ~3.4±0.1 dB/cm was estimated from Eq.(5) since the measurements of $G_{int}$ were within an estimated experimental error of ±3%. Similar gain has also been reported with 100 mW of launched pump power for 2.5 μm wide waveguides using a two-step FAIE process.

To further investigate the characteristics of buried waveguides formed in accordance with embodiments of the invention, the refractive index of the waveguide may be modeled as a function of the annealing time and the electric field. The substrates used were commercially available IOG-1 active phosphate glass from Schott Glass Technologies Inc. The glasses were co-doped with $Er_2O_3$ (2.2 wt %) and $Yb_2O_3$ (4.7 wt %). The buried channel waveguides were fabricated using a two-step process in accordance with embodiments of the invention and involving a first ion-exchange step and then a subsequent field assisted anneal (FAA) process.

First, 6 μm wide $K^+$—$Na^+$ exchanged channel waveguides were fabricated, the exchange temperature T=385° C. and the time t=1 h. Next, Al film and Au film were deposited onto the top and bottom of the glass substrates in order to act as the positive and negative electrodes. The samples were then placed in an enclosed furnace with the FAA temperature $T_f$=380° C. The FAA time $t_f$=20 min to 1 h and applied electric field $E_o$=60 to 180V/mm were used. The TE and TM mode effective indices of the ion-exchanged planar waveguides were measured using a Metricon model 2010 prism coupler. The refractive index profiles were generated from the measured mode indices using the inverse Wentzel-Kramers-Brillouin method. The mode intensity profiles of as-exchanged waveguides and buried waveguides, as well as the effective buried depths, were recorded with the use of standard end-fire coupling setup and calibrated image capture card.

Figure 7:
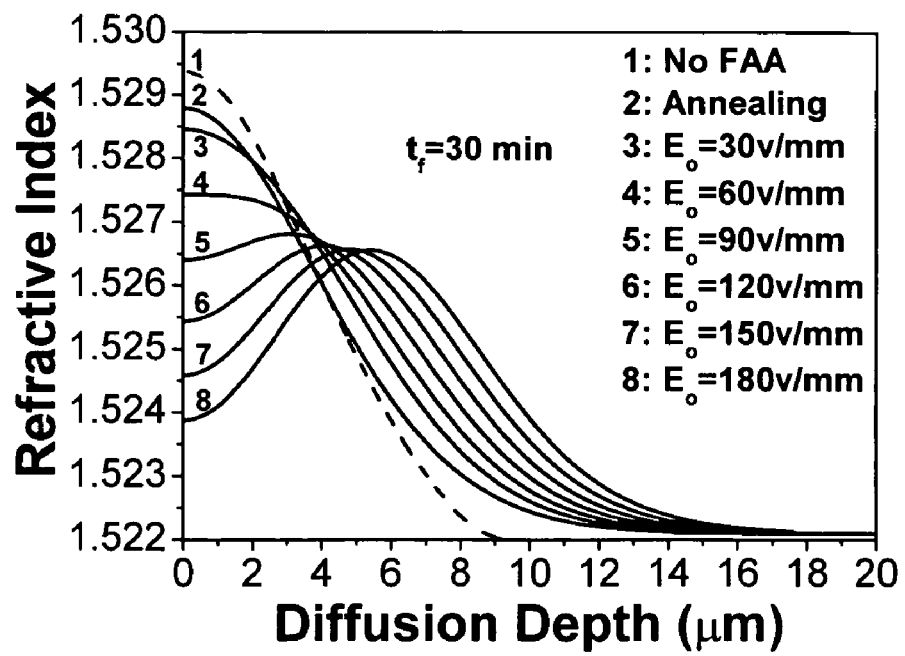
Figure 8:
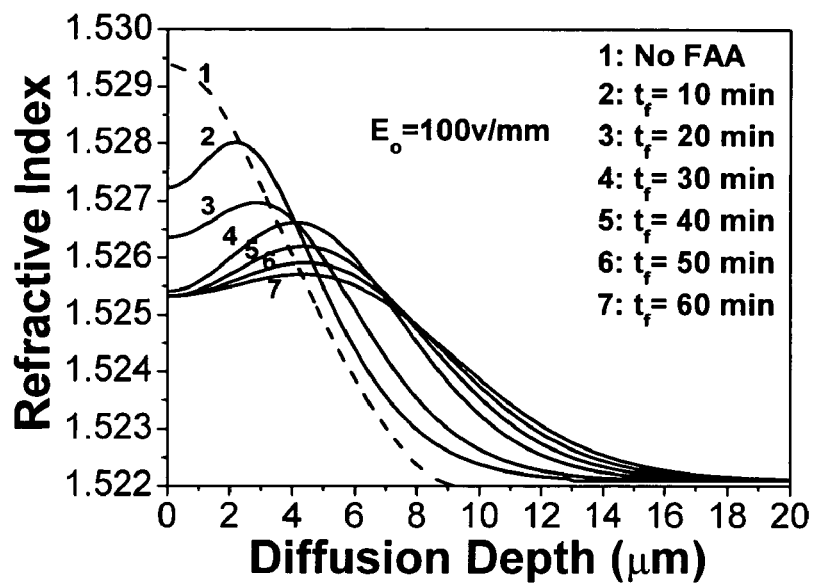

FIG. 7 and FIG. 8 compare the simulation results of the refractive index profiles of TE modes in $K^+$—$Na^+$ ion-exchanged planar waveguides using FAA process with different $E_o$ and $t_f$, respectively. The dashed curves are the index profiles measured in the planar waveguides before FAA. From the analysis of the effective indices of TE and TM modes, a small positive birefringence, i.e., $n_{TM} > n_{TE}$, is obtained, and is found to be $<9.8 \times 10^{-4}$ and $<3.2 \times 10^{-4}$ at 632.8 nm and 1550 nm, respectively. As $E_o$ or $t_f$ increases, the index peak decreases due to thermal diffusion, and the peak position moves deeper into the glasses because of the applied E, and buried waveguides are formed. From FIG. 7 when $E_o$ is low the index peak position is also low. In FIG. 8 the profile width increases for a long time $t_f(>50$ min) with a fixed $E_o = 100$V/mm, and $\Delta n_{max}$ decreases more. A well confined optical mode cannot be supported in the waveguide for a long FAA process. Thus, high $E_o$ and short $t_f$ should preferably be used to obtain buried waveguides for better performance. Similar results were also obtained for TM modes.

Figure 9:
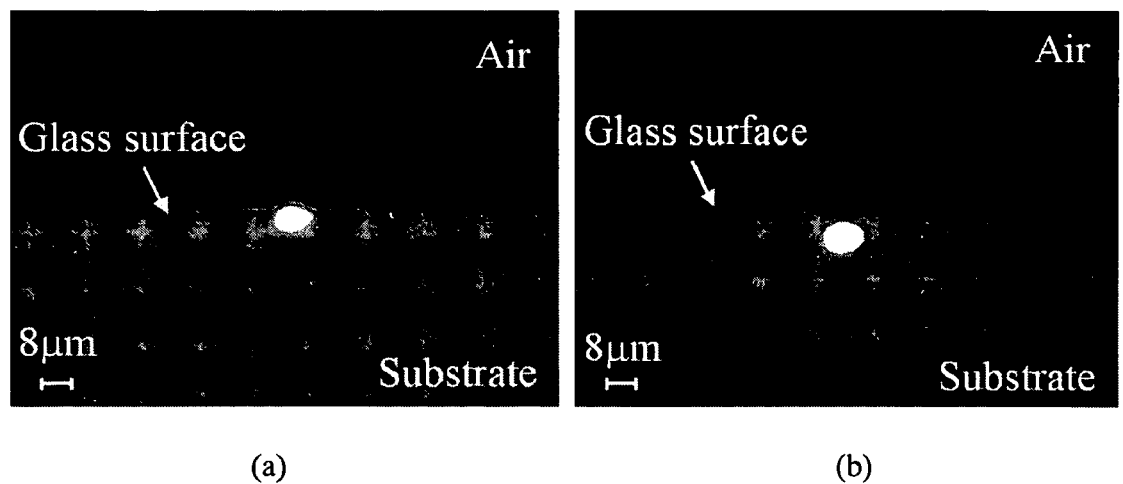
Figure 10:
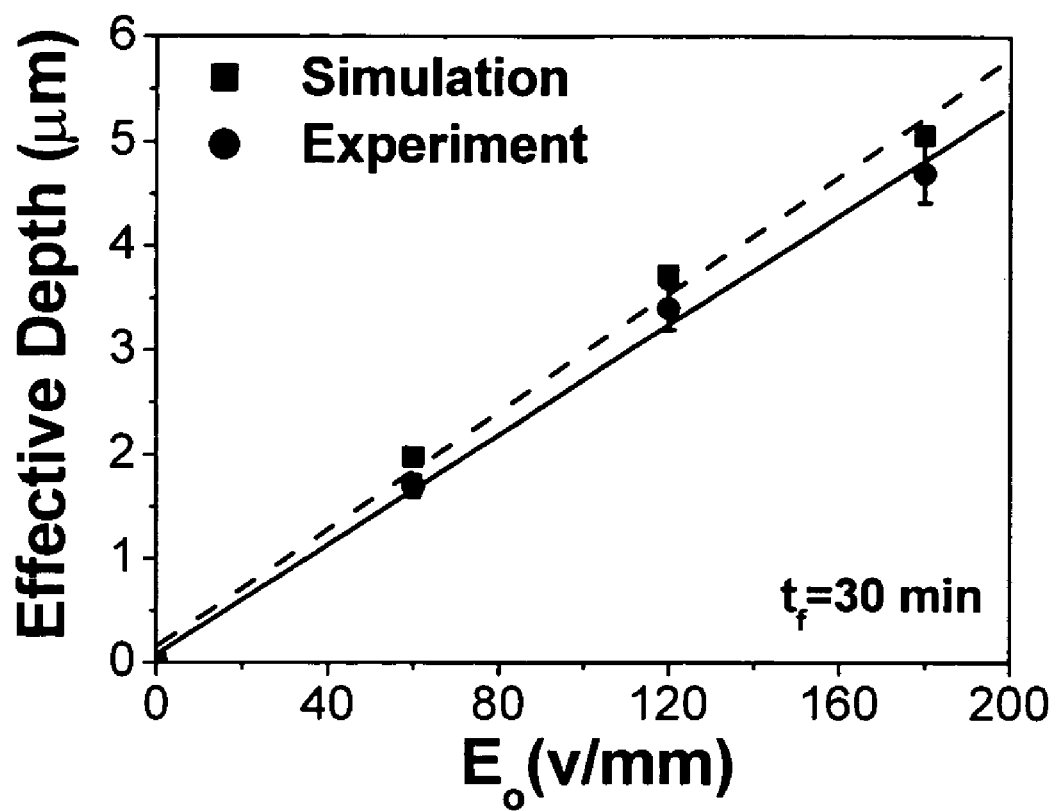

The buried depths of the channel waveguides were also investigated experimentally in terms of the mode profiles, and the difference between the glass surface and the center of the mode gives the effective buried depth. FIG. 9(a) and (b) show the comparison results of the mode intensity profiles taken on the surface ion-exchanged waveguide and buried FAA waveguide. $T_f = 380°$ C., $E_o = 120$V/mm and $t_f = 30$ min were used. The mode profile of the FAA waveguide shifts from the glass-air surface, due to the refractive index peak migrating deeper into the glass substrate, and a more symmetrical intensity profile is obtained. For the as-exchanged surface waveguide and buried waveguide, the center of the mode profile was measured to be ~3.8 μm and ~7.2 μm below the glass surface, respectively, as shown in FIG. 9. The effective buried depth is estimated to be ~3.4 μm. FIG. 10 shows that effective buried depths of FAA channel waveguides as a function of $E_o$ for a fixed $t_f = 30$ min. The dash line and the solid line correspond to the linear fit for the simulation data and the experimental data, respectively. Comparison shows that the effective buried depth measured is in good agreement with the simulated result.

From the above it can be seen that at least in preferred embodiments of the invention buried channel waveguides can be formed by thermal two-step ion-exchange method in $Er^{3+}$—$Yb^{3+}$ co-doped phosphate glasses. Channel waveguides were first fabricated using $K^+$—$Na^+$ ion-exchange process. Pure KNO3 molten bath with T=385° C. and t=1 h were used. A second field-assisted annealing step was used to make the buried waveguides. The propagation losses of buried channel waveguides were measured to be ~0.3 dB/cm, and the fluorescence and ASE spectra of bulk glasses, ion-exchanged waveguides and FAA buried waveguides are found to be similar to each other. When $T_A \approx T$, preferably the optimum FAA temperature is the ion-exchange temperature ±10° C., the waveguide performances are improved, and the FAA waveguides are buried at ~2.81 μm below the glass surface. When $T_A > T$, the waveguide performance deteriorates. Improved net gain of ~3.4±0.1 dB/cm were measured at a signal wavelength of 1.534 μm with 120 mW pump power at 975 nm wavelength. Hence, compared to other techniques FAA is a simple and effective method for fabricating buried ion-exchanged waveguides.

What is claimed is:

1. A method for forming an optical waveguide in a substrate having first and second surfaces, the method comprising the steps of:
   (a) an ion-exchange to form a waveguide in said first surface of said substrate at a predetermined ion-exchange temperature, wherein the substrate is exposed to an external source of ions, and wherein a surface waveguide is formed;
   (b) forming an electrode on said first and second surfaces of said substrate; and
   (c) carrying out a field-assisted annealing step on said substrate to move said waveguide from said first surface deeper into said substrate to form a buried waveguide, wherein the peak of the refractive index of said buried waveguide is below said first surface,
said method comprising only one exposure of the substrate to an external source of ions.

2. The method of claim 1 wherein said substrate comprises a phosphate glass doped with $Er^{3+}$ and $Yb^{3+}$ ions.

3. The method of claim 2 wherein said ion-exchange step is a $K^+$—$Na^+$ ion-exchange process.

4. The method of claim 1 wherein after the formation of the surface waveguide by said ion-exchange step, conductive materials are deposited on both surfaces of said substrate to serve as said electrodes in said field-assisted annealing step.

5. The method of claim 1 wherein said field-assisted annealing step is carried out at a temperature of between 220° C. and 420° C.

6. The method of claim 1 wherein said field-assisted annealing step is carried out for between 15 minutes and 1 hour.

7. The method of claim 1 wherein an electric field of greater than 60 V/mm is applied across said substrate during said field-assisted annealing step.

8. The method of claim 1 wherein the field-assisted annealing step is carried out at a temperature ±10° C. relative to the predetermined temperature at which the ion-exchange takes place.

* * * * *